(12) United States Patent
Kumar et al.

(10) Patent No.: US 7,170,628 B2
(45) Date of Patent: Jan. 30, 2007

(54) EFFICIENT PROCESSING OF IMAGES IN PRINTERS

(75) Inventors: Santhosh Trichur Natarajan Kumar, Kerala (IN); Mohan Kumar Yenigalla, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 959 days.

(21) Appl. No.: 10/323,794

(22) Filed: Dec. 20, 2002

(65) Prior Publication Data

US 2004/0120006 A1 Jun. 24, 2004

(51) Int. Cl.
*G06F 3/12* (2006.01)
*G06K 15/00* (2006.01)

(52) U.S. Cl. .................. 358/1.15; 358/1.9; 358/1.2; 358/1.16

(58) Field of Classification Search ............... 358/1.15, 358/1.16, 1.17, 1.18, 1.1, 1.2, 1.3, 1.4, 1.5, 358/1.6, 1.7, 1.8, 1.9, 1.11, 1.12, 1.13, 1.14
See application file for complete search history.

(56) References Cited

U.S. PATENT DOCUMENTS

| | | | |
|---|---|---|---|
| 4,639,791 A * | 1/1987 | Masaki | 358/300 |
| 5,479,587 A * | 12/1995 | Campbell et al. | 358/1.17 |
| 6,049,343 A * | 4/2000 | Abe et al. | 345/501 |
| 6,115,140 A * | 9/2000 | Bresler et al. | 358/1.9 |
| 6,285,458 B1 * | 9/2001 | Yada | 358/1.15 |
| 6,792,864 B2 * | 9/2004 | Piatt et al. | 101/484 |

FOREIGN PATENT DOCUMENTS

JP 410207668 A * 8/1998

* cited by examiner

*Primary Examiner*—Dov Popovici
(74) *Attorney, Agent, or Firm*—Robert D. Marshall, Jr.; W. James Brady; Frederick J. Telecky, Jr.

(57) ABSTRACT

A printer controller in which the image data received in indexed format is stored only in indexed format. The image data is converted to long format when required for rendering operations by using an appropriate lookup table. By storing the image data only in indexed format until the time of rendering, the memory requirements within a system may be minimized. According to another aspect of the present invention, floating point operations (providing higher precision) may be used in a interpreter block and fixed point operations (providing more speed) may be used in a rendering block, while avoiding/reducing image artifacts in upscaled images. A check is performed to determine whether a pixel in the upscaled image maps back to fall within the boundary of the source image, and corrective action is taken if the pixel does not fall within the boundary.

27 Claims, 2 Drawing Sheets

EFFICIENT PROCESSING OF IMAGES IN PRINTERS

BACKGROUND OF THE INVENTION

1. Field of the Invention

The present invention relates to printers, and more specifically to a method and apparatus for efficient processing of images in printers.

2. Related Art

Printers are often used to print a specified content (received from an external system such as personal computers) on medium such as paper. The content to be printed ("page content") is typically specified by page description languages (PDL) such as Postscript (PS) and Printer Control Language (PCL), as is well known in the relevant arts. Printing generally entails converting a page content specified by a PDL to a corresponding bit map. The bit map may then be used to print the content on a desired medium (e.g., paper).

Bit maps are often generated by performing logical operations on data representing source, destination and paint. As is well known, a destination generally refers to a bit-map formed by rendering the display-list elements up to that point of time. A source refers to a current display list element being rendered, and paint refers to the shade of color or a pattern that the source maybe filled with in the destination. Destination is generally generated based on the source and paint.

Images are often contained in source and paint. An image is generally represented in the form of a bit map, and the corresponding data ("image data") is used to generate the destination as noted above. Thus, generating page content typically entails processing the image data (along with the other operands).

Processing of images often consumes several resources such as memory space and processing power. In general, the approaches to process images need to be implemented while potentially meeting several requirements (e.g., minimizing resource usage, enhancing throughput performance, etc.). What is therefore needed is a method and apparatus which enables processing images while meeting one or more of such requirements.

SUMMARY OF THE INVENTION

An aspect of the present invention minimizes memory requirements when processing an image data containing pixels in an indexed format. The image data is stored in a memory in indexed format and converted to an expanded (longer) format only when the specific pixels are required for rendering operations. The conversion may be performed using a lookup table which provides a mapping of pixel values from the indexed format to the expanded format.

As lesser memory storage would be required to store the image data in indexed format compared to the expanded format, the memory requirements to support printing of page content (generated based on the image data) in a printer may be minimized.

One more aspect of the present invention minimizes the number of memory accesses and processing requirements when color conversion needs to be performed on such indexed data. A single table is used to convert to expanded (uncompressed) format as well as for color conversion. The single table is implemented taking into account the expanded code corresponding to each element in the indexed format, as well as the corresponding color converted code.

Another aspect of the present invention may avoid display artifacts when an interpreter module operates at a first mathematical precision and a rendering module operates at a second mathematical precision. In an embodiment, a first scale factor used to upscale a source image portion to generate the upscaled image portion is determined. Similarly, a second (reverse) scale factor used to map each pixel of the upscaled image back to a corresponding pixel in the source image portion is also determined. In an embodiment, the first mathematical precision is determined by a precision of a floating point operation, and the second mathematical precision is determined by a precision of a fixed point operation.

A determination is then made as to whether a first pixel maps back to fall within the source image portion according to the second scale factor and the second mathematical precision, wherein the first pixel is comprised in the upscaled image portion. If the first pixel does not map back, corrective action is taken to ensure that display artifacts are avoided or minimized.

In one embodiment, the first pixel is located at a border of the upscaled image, wherein only pixels at the border are mapped back to determine whether the corresponding pixels map back to fall within the source image portion. For example, in the case of a rectangle one the pixels at opposite edges need to be checked to determine whether the entire upscaled image portion would map back to fall within the boundaries of the corresponding source image.

In an alternative embodiment, each pixel in the upscaled image portion is checked to determine whether the pixel maps back to fall within the source image portion. If a present pixel does not fall within the source image portion when mapped back, an adjacent pixel is copied back as a present pixel.

Yet another aspect of the present invention allows any limited memory to be efficiently managed when processing an image data containing pixels represented in a packed format (e.g., four pixels of 2-bits each being packed in a byte) and when the image data in the packed format is represented in a compressed format. In an embodiment, an external interface receives a portion of the image data and stores the portion in a first buffer. An uncompression block uncompresses the portion of the image data to generate an uncompressed data containing the image data in packed format. The uncompressed data is stored in a second buffer.

A bit re-sampling block re-samples the uncompressed data to generate the pixels in a desired format, wherein each of the pixels is aligned with a byte/word boundary such that the desired format is suitable for additional computation to be performed on the pixels. The re-sampled bits are stored in a third buffer. The size of the third buffer is substantially greater than the size of the second buffer, and the size of the second buffer is substantially greater than the size of the first buffer. By maintaining such a relationship in allocation of buffer space in the memory, the limited memory space may be optimally utilized.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
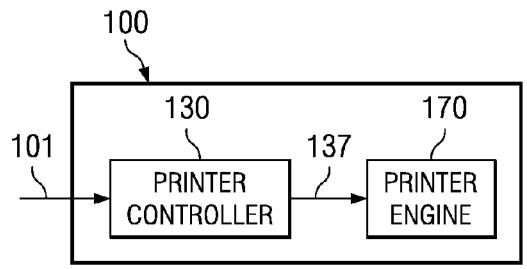
FIG. 1 is a block diagram illustrating the details of an example printer.

1. Overview and Discussion of the Invention

According to an aspect of the present invention, a printer may receive image data (representing an image) in an indexed format, and save the data in the same format until the data is to be used for performing the raster operations. Due to such storage, the memory requirements needed to process a page received according to a page description language may be reduced substantially.

According to another aspect of the present invention, three buffers may be used in generating trapezoids based on images represented in compressed data format. A first buffer may be used to store a portion of the image data in compressed format. A second buffer may be used to store the uncompressed data. If the pixel resolution does not match the byte/word size (e.g., 8 bits), the pixel data may be resampled (to generate pixel data elements of byte/word size) and stored in a third buffer. The third buffer may be substantially bigger than the second buffer, and the second buffer may be substantially bigger than the first buffer.

Such an approach may enable efficient use of available memory. In addition, due to the large size of the third buffer, bigger trapezoids may be generated and stored. In general, large trapezoids lead to a higher throughput performance in rendering, which in turn may lead to printers printing pages at a high speed (number of pages per minute).

Another aspect of the present invention prevents display artifacts when generating bit maps (which are to be sent to printer engine for printing) based on expansion of source images when the trapezoid boundaries are determined using computations in a first precision, and the determination of specific points to use during expansion is based on computations in a second precision. The artifacts are prevented by mapping back the boundary of an expanded trapezoid to a corresponding source trapezoid.

If the boundary generated from such mapping back falls outside of the source trapezoid corrective action is taken. For example, the lines in the expanded trapezoid falling mapping to outside of the source trapezoid may be generated as a part of a next expanded trapezoid. Alternatively, additional source lines may be included as a part of the source image such that the entire mapped back image falls within the available source lines. Due to such an approach, display artifacts are avoided, in addition to minimizing the number of computations required in some alternative embodiments.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Printer

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 a bitmap (representing the page content to be printed) suitable in format for printing, and prints the bit map on medium such as paper. Printer engine 170 can be implemented in a known way. In an embodiment, printer engine 170 is implemented using laser technology.

Printer controller 130 may receive statements (defining a page content to be printed) on path 101, and generates a bitmap representing the page content. The statements may be received from an external computer system (not shown), and be specified in a page description language (PDL) such as Printer Control Language (PCL) or PostScript, well known in the relevant arts.

Bit maps are often generated by performing logical operations on data representing source, destination and paint as described in the above sections. Images are often contained in source and paint. Processing of images in printer controller 130 often consumes several resources such as memory space. The manner in which memory usage may be reduced while processing images is described below with several examples.

3. Processing Images Received in Indexed Format

Figure 2:
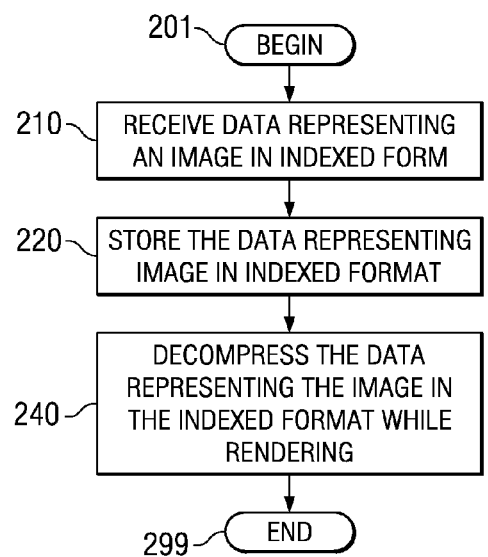
FIG. 2 is a flow chart illustrating the manner in which a page may be rendered, according to an aspect of the present invention.

FIG. 2 is a flow chart illustrating the manner in which a page may be rendered according to an aspect of the present invention. The method is described with reference to FIG. 1 for illustration. However, the method can be implemented in other printers as well. The method begins in step 201, in which control immediately passes to step 210.

In step 210, printer controller 130 may receive data representing an image ("image data") containing multiple pixels in an indexed format. The remaining steps of FIG. 2 can be appreciated by understanding the manner in which indexing based technologies generally operate. Accordingly, the indexing technology is described first in the below paragraph.

In an indexed format, each point (pixel) of the image is represented using a small number of bits ("short format"). The point is mapped to a higher-resolution format ("long format") by using a look-up table which can be programmed generally as a designer wishes. As only a limited number of colors within the entire possible range of hues are typically used at a given time, the designer may store only the range of colors of possible interest in the look-up table. Each point in the image data received in indexed format is converted (mapped) to a higher bit resolution by using the look-up table.

Continuing now with reference to FIG. 2, in step 220, printer controller 130 may store the image data in indexed/short format. In step 240, printer controller 130 may convert the indexed/short form data into long format while rendering (i.e., when needed for performing raster operations). That is, each pixel may be converted to the long format only when needed. The method ends in step 299.

Thus, the bit maps for printing are generated based on data in the long format, which typically simplifies the rendering (performing raster operations) task as other operands for logical operation may be presented in a format compatible with the long format. On the other hand, by storing the data in indexed format only, the storage requirements may be minimized. Example embodiment(s) implementing the method of FIG. 2 are described in sections below.

4. Printer Controller

Figure 3:
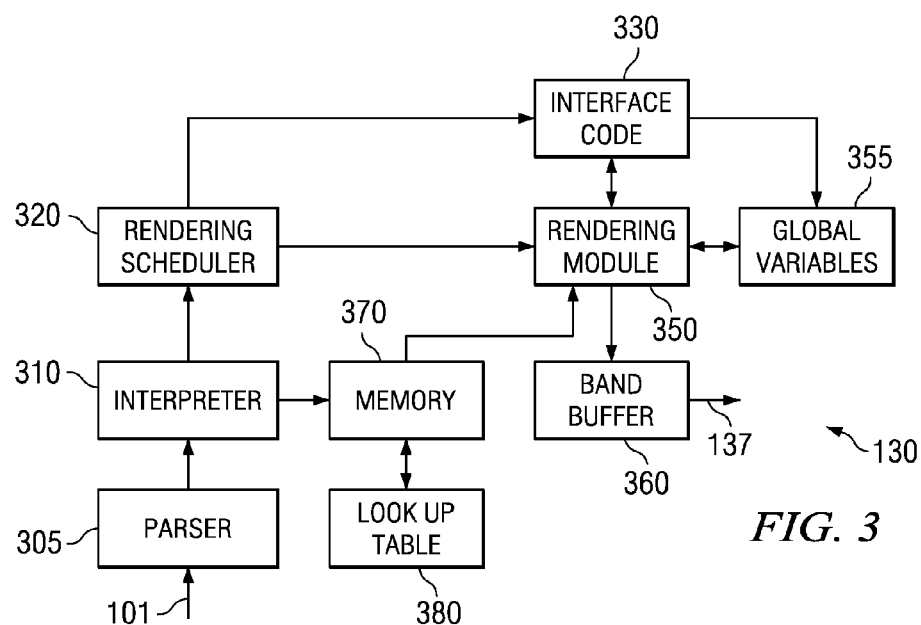
FIG. 3 is a block diagram illustrating the details of an embodiment of a printer controller.

FIG. 3 is a block diagram illustrating the details of an embodiment of printer controller 130 implemented in accordance with the present invention. Printer controller 130 is shown containing parser 305, interpreter 310, rendering scheduler 320, interface code 330, rendering module 350, global variables block 355, band buffer 360, memory 370 and lookup table 380. Each component is described in further detail below.

Parser 305 ensures that the statements (describing a page content) received on path 101 are consistent with a page description language (PDL), and passes the received statements to interpreter 310. The statements contain pixel data elements representing images ("original images") processed according to various aspects of the present invention. Parser 305 may be implemented in a known way.

Rendering scheduler 320 schedules each logical part for subsequent processing (rendering). One of several well known approaches may be used to implement rendering scheduler 320. In an embodiment described below, only the portions of the original images required during rendering, are stored in memory 370.

Interface code 330 provides the interface between rendering scheduler 320 and rendering module 350. In general, interface code 330 interfaces with rendering scheduler 320, and performs various initializations required for rendering modules. Global variables 355 represents various values used for rendering (and other operations) which generates bit maps representing the page.

Interpreter 310 converts the statements received in PDL format to corresponding display lists. The statements may contain data representing images which in turn may be in indexed format ("indexed image data"). A mapping table available in look up table 380 may be used to convert the data in indexed format into a true color format. The PDL statements may specify the data forming such a mapping table as well. As described below, rendering module 350 performs such a conversion from indexed format to true color (longer/expanded) format while rendering.

Rendering module 350 generates a bitmap for the page based on the display lists provided in memory 370. In general, rendering needs to be performed to support the specific PDL (e.g., PostScript, Page Description Language) and the interpretation approach used. Rendering is generally described in a book entitled, "PostScript Language Reference Manual—2nd Edition—Red Book", available from Adobe Systems Incorporated, which is incorporated in its entirety herewith.

While rendering, rendering module 350 may retrieve the indexed data stored in memory 370, and generate uncompressed pixel data (in long format) by mapping the indexed data to the uncompressed pixel data using the mapping information available in lookup table 380. The uncompressed (de-indexed) data is then used to perform raster operations as specified by the PDL statements. The data may be mapped only when the pixel is required for rendering (raster operations) such that the image data is stored in indexed format only. The bitmap generated from the raster operations may be stored in band buffer 360.

The uncompression and any necessary color conversion (to a format suitable for printing) may be accomplished using a single mapping table. In general, the table needs to consider the uncompressed data element corresponding to each indexed element, and the eventual color converted code for the uncompressed data element. Thus, the table is to be designed to map each indexed data element directly to the color converted code.

By storing the image data in the indexed format only, memory requirements to generate a page (for printing) may be minimized. It may be necessary to minimize the memory requirements when generating display lists in interpreter 310 as well. The manner in which interpreter 310 generates display lists while minimizing memory requirements is described below in further detail.

5. Interpreter

Figure 4:
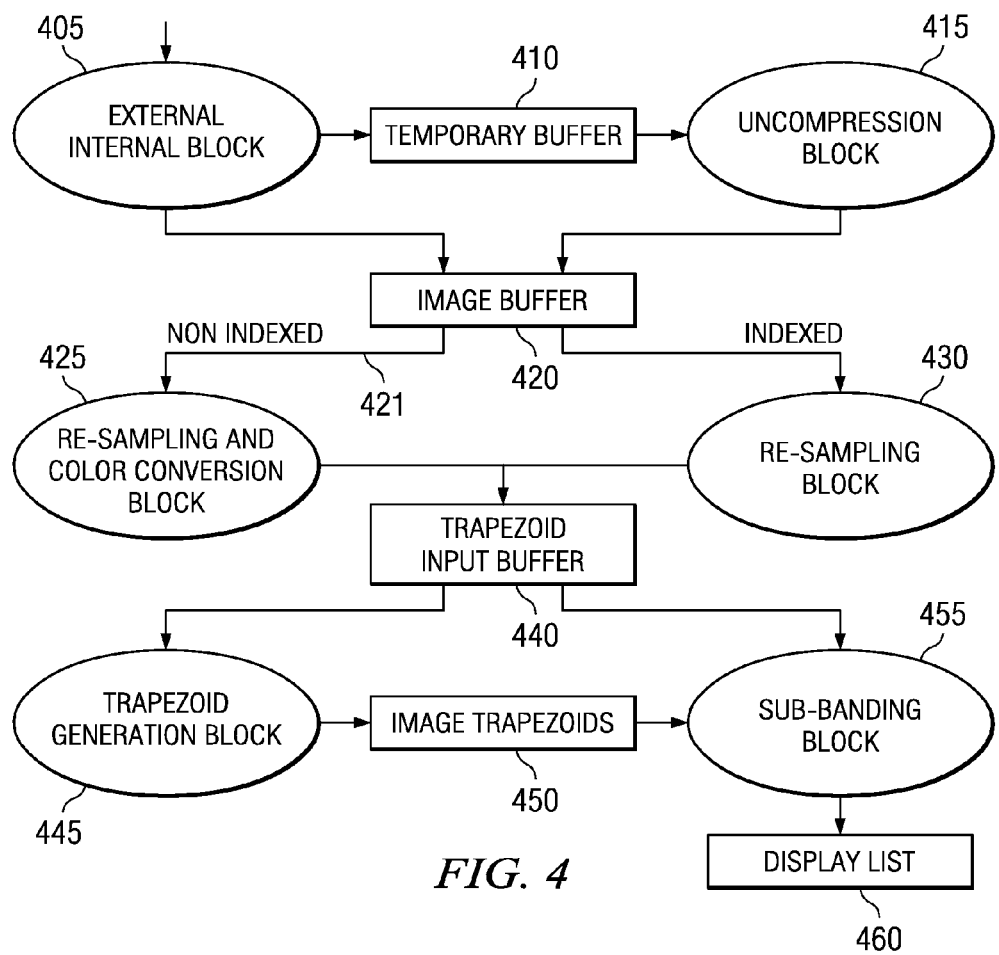
FIG. 4 is a block diagram illustrating the details of an embodiment of an interpreter, implemented in accordance with the present invention.

FIG. 4 is a diagram illustrating the manner in which interpreter 310 generates display lists in an embodiment of the present invention. FIG. 4 is shown containing external interface block 405, temporary buffer 410, uncompression block 415, image buffer 420, re-sampling and color conversion block 425, re-sampling block 430, trapezoid input buffer 440, trapezoid generation block 445, image trapezoids 450, sub-banding block 455, and display list 460. The components represented by circles indicate a corresponding operation being performed. Each component is described in further detail below.

External interface block 405 receives image data and stores the received data in temporary buffer 410 if the image data is received in a compressed format. Various compressions techniques, many well known in the relevant arts (e.g., run length algorithm, JPEG compression, and Delta compression), can be used to compress the image data. If the image data is received in uncompressed format, the data may be passed to image buffer 420 directly.

Temporary buffer 410 may store the compressed image data received from parser 310 (via external interface block 405). Uncompression block 415 may decompress the compressed image data received from temporary buffer 410 to generate the corresponding uncompressed image data. The uncompression of the compressed image data may be performed in a known way.

Image buffer 420 stores image data received in an uncompressed form ("uncompressed image data"). The uncompressed image data may be received after uncompression from uncompression block 415, or directly from external interface block 405 in the case of receiving uncompressed image data. The uncompressed data can either represent indexed data or non-indexed data.

Bit re-sampling and color conversion block 425 may perform bit re-sampling on non-indexed images (or specifically the pixel data elements representing the images) received on line 421. Re-sampling is generally performed to ensure that each pixel is represented using a desired number of bits, irrespective of the format in which the non-indexed images are received. For example, the received data may contain four pixels of data (in a single plane) represented as 2-bits each, and the four pixels may be packed into a single byte (8-bits) of data. The data may be re-sampled to generate the four pixels represented in a byte format. In general, re-sampling is performed to convert pixels to a desired number of bits and to align each pixel value to a byte boundary (such that the pixels are in a form suitable for further processing).

In addition, bit re-sampling and color conversion block 425 may perform a color conversion on the re-sampled image data to convert the image data to a form suitable for printing (e.g., CMYK space well known in the relevant arts). The resulting image data may be stored in trapezoid input buffer 440. In case of indexed image data, bit re-sampling block 430 processes the indexed image data received from image buffer 420, and stores the re-sampled data in trapezoid input buffer 440.

Trapezoid generation block 445 may generate trapezoids for the data stored in trapezoid input buffer 440. The trapezoids may be generated for large sizes of the image data stored in trapezoid input buffer 440. Trapezoid generation block 445 may compute the device coordinates (i.e., specific points on the page) for the image data. Since the trapezoids are generated for large blocks of image data, the processing power required for rendering may be reduced (assuming that a certain overhead is present to process each trapezoid). The trapezoids thus generated may be stored in image trapezoids 450.

Sub-banding block 455 may divide the page received into multiple bands, with each band spanning the entire horizontal direction of a page. The specific trapezoids and the portion of each trapezoid to be included in each sub-band is included in a display list representing the sub-band. The display lists thus generated, may be stored in display list memory 460 and later provided to rendering module 350 for rendering.

According to an aspect of the present invention, the size (i.e., amount of required memory) of the trapezoid input buffer 440 is substantially more than the size of image buffer 420, and the size of the image buffer 420 is substantially more than the size of temporary buffer 410. Such a design approach may enable optimal use of limited memory space available in a printer system as limited buffer space only may be required for uncompression (from compressed image data), substantially more buffer space may be required to store the uncompressed image, and a lot more buffer space may be required to store the re-sampled data after the uncompression.

Such approach enables maximizing the size of trapezoids, which in turn may lead to minimizing processing power requirements in interpretation and rendering.

Additional challenges may be presented if cutting of the trapezoids in interpreter 310 is performed at one mathematical precision and the determination of pixels needed for expansion is performed at another mathematical precision. The problem is described below with an example and then the manner in which the corresponding disadvantages may be avoided is described.

6. Problem With Using Different Resolutions

For illustration, it is assumed that a source image portion (source trapezoid) of 100×100 pixels is to be converted to an expanded image portion of 170×170. It is further assumed that the boundaries of the expanded image portion are determined in interpreter 310 using floating point computations, while rendering module 350 determines the specific pixels of the source image portion to be used for expansion using fixed point computations.

As may be appreciated, fixed point computations operate at a lower precision, but with less computational requirements. Such lower precision may be sufficient as use of pixels in adjacent lines generally does not degrade the image quality (as perceived by a human eye) printed by printer 100. However, the lower computational requirements generally leads to enhanced throughput performance.

However, the use of computations of different resolutions may lead to display artifacts. For example, in the above illustration, interpreter 310 may compute a scale factor of (170/100=1.7) in both X and Y directions when computing the boundaries of an expanded image portion. Further assuming that rendering module 350 uses 8Q8 format (example of a fixed point), the scale factor in the reverse direction (i.e., mapping from expanded image to source image) 100/170 equals 151 in the Q8 position (100/170<<8, wherein '<<' represents a left-shift operation by 8 positions) and then rounded.

Thus, when rendering module 350 generates pixel values corresponding to the expanded image, the points in the expanded image are mapped back to points on the source image. The mapping back may be used to determine the specific pixels in the source image to use for generating the pixel values for the expanded image.

Due to the difference in resolutions, the pixels at the edge of the expanded image may map to areas outside of the source image. In the above noted illustrative example, a point (170, 170) may be mapped back to (101, 101) as (170*151>>8, wherein '>>' represents a right shift operation) equals 100.27 and 100.27 may be rounded to 101.

As would be readily appreciated, any point with a coordinate of above 100 is outside the source image portion. Generating an expanded image based on such outside points may lead to display artifacts, for example, as memory may contain unknown data corresponding to the position of the outside point. It is generally desirable to avoid such display artifacts. The manner in which the display artifacts may be avoided is described below with several examples.

7. Avoiding Display Artifacts When Using Different Resolutions

In one embodiment, rendering module 350 examines every point of the expanded image to check whether the point maps inside or outside the source image portion. In one implementation, if the point maps to outside of the source area, the previous pixel in the expanded image portion is replicated. Due to the averaging property of the human eye, perceptible display artifacts may be avoided in such a situation.

One problem with such an approach is that checking whether every point maps to inside the source image portion requires a corresponding amount of computational resources, and accordingly the throughput performance of rendering module 350 may be impeded. An alternative approach which may avoid display artifacts without substantial degradation in throughput performance, is described below with reference to FIG. 5.

Figure 5:
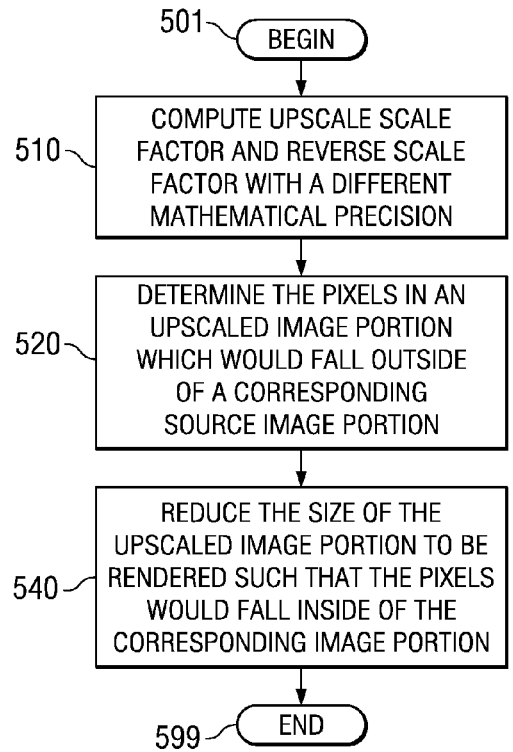
FIG. 5 is a flow chart illustrating the manner in which display artifacts may be avoided when using different mathematical precision in interpretation and rendering.

FIG. 5 contains a flow-chart illustrating a method using which display artifacts may be avoided when using computations of different precision during rendering and interpretation stages. The method begins in step 501, in which control immediately passes to step 510.

In step 510, the upscaling scale factor and reverse scale factor may be determined for operations in different mathematical precisions. In the illustrative example of the previous section, the upscaling scale factor is computed for floating point operations and the reverse scale factor is computed for fixed point computations. Interpreter 310 may perform such determination, and also the other steps of FIG. 5 described below.

In step 520, the pixels in an upscaled image portion which would fall outside of a corresponding source image portion are determined. Assuming the source image portion represents a rectangle, it may be sufficient to determine whether the coordinates of two opposite corners map back to fall within the corresponding source image portion. In the illustrative example of the previous section, the pixels in both the last horizontal and vertical lines with a coordinate of 170 fall outside of the source image portion.

In step 540, the size of the upscaled image portion to be rendered is reduced such that the pixels would fall inside of the corresponding image portion. In other words, only an upscaled image of size of (169×169) is rendered using the source image portion presently being processed. The horizontal and vertical lines corresponding to coordinate 170 are scheduled for rendering using the next image portion. The method ends in step 599.

Thus, pixel values representing successive image portions may be rendered while ensuring that the pixels at the border of the upscaled image do not map to outside of the source image portion. Display artifacts are avoided as a result. In addition, as the determination of whether a pixel maps back to fall within a corresponding source image is not performed for most pixels, the throughput performance of rendering module 350 is not impeded.

Using the approaches described above, several embodiments of printer controller 130 may be implemented to efficiently process images. The embodiments may be implemented in a combination of software, hardware and firmware. The description is continued with reference to the manner in which printer controller 130 may be implemented substantially in software.

8. Software Implementation

Figure 6:
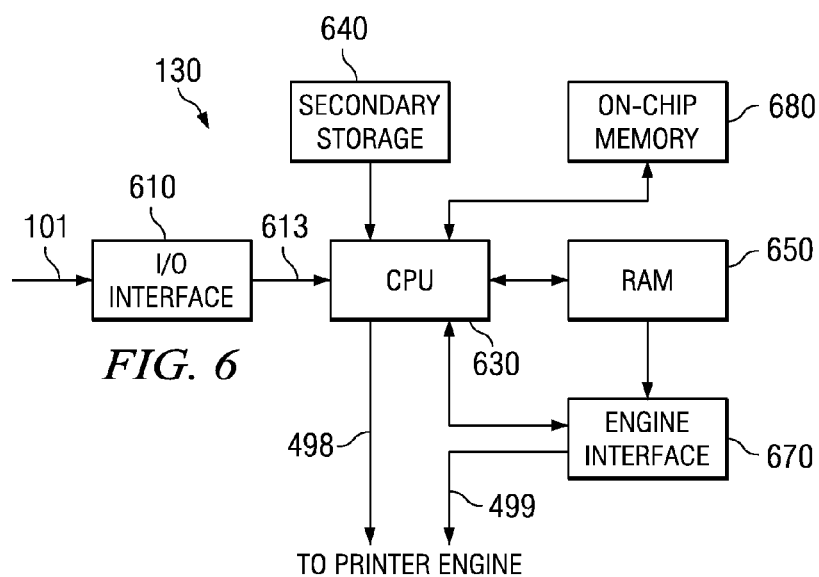
FIG. 6 is a block diagram illustrating the details of an embodiment of a printer controller implemented substantially in hardware.

FIG. 6 is a block diagram illustrating the details of printer controller 130 implemented substantially in software according to an aspect of the present invention. Printer controller 130 is shown containing input/output (I/O) interface 610, central processing unit (CPU) 630, secondary memory 640, random access memory (RAM) 650, engine interface 670 and on-chip memory 680. Each component is described below in further detail.

Input/output interface 610 provides the interface with an external system such as personal computer. I/O interface 610 receives statements on path 101 requesting to print a page content specified in a page description language (PDL) such as Printer Control Language (PCL) or PostScript. I/O interface 610 forwards the statements to CPU 630 on line 613.

Engine interface 670 provides an interface between printer controller 130 and printer engine 170. Lines 698 and 699 together represent line 137 illustrated in FIG. 1. Engine interface 670 may be implemented in a known way.

On-chip memory 680 generally allows faster accesses in storing and retrieving data, and may be used to store the data requiring fast accesses. In an embodiment, on-chip memory 680 is used to store the rendered bit maps representing the destination image. By storing the rendered bit maps in on-chip memory 680, the storing task may not be a bottleneck while CPU 630 renders a bit map. Such a feature may be particularly important as the processing speeds of CPU 630 may improve substantially over time. The bit maps are then transferred to RAM 650 (which is used to provide band buffer 360).

RAM 650 may be used to store the instructions prior to execution (by CPU 630). In addition, RAM 650 may be used to implement temporary buffer 410, image buffer 420, trapezoid input buffer 440, and band buffer 660. As the available memory space in RAM 650 may be limited and is shared for multiple purposes, it may be necessary to share the available space efficiently. The memory can be used efficiently according to various aspects of the present invention as described above.

Secondary memory 640 may contain units such as hard drive (not shown), removable storage (e.g., flash memory, also not shown). Secondary storage 640 may store software instructions and data (for example, the global parameters), which enable CPU 630 to provide several features in accordance with the present invention. The software instructions may be provided to CPU 630 from other sources such as over a network implemented using protocols such as TCP/IP.

CPU 630 executes the instructions provided from secondary memory to process the print statements and generate bit maps as described in the previous sections. The instructions may also cause the bitmap to be provided to printer engine 170 on path 698.

Thus, the present invention may be implemented using software running (that is, executing) in printer controller 130. In this document, the term "computer program product" is used to generally refer to removable storage unit or hard disk installed in hard drive. These computer program products are means for providing software to printer 100. Computer program products generally contain computer readable medium providing software to printer controller 130. The computer readable medium can be provided external to printer controller 130.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of processing an image data containing a plurality of pixels in an indexed format, wherein said image data is contained in a page description language specifying a content to be printed on a page, said method comprising:
    receiving said image data in said indexed format;
    storing said image data in said indexed format in a memory;
    converting said plurality of pixels to an expanded format by accessing a look-up table, wherein said lookup table specifies a mapping of said image data in said indexed format to said expanded format; and
    performing a plurality of raster operations using said plurality of pixels in said expanded format to generate a bit map representing said content,
    wherein said converting of a pixel is performed when said pixel is required by said performing such that said pixel can be stored in said memory in said indexed format.

2. The method of claim 1, wherein said image data is to be converted to a form suitable for printing on a page, said method further comprising using a single table to convert said plurality of pixels to said form suitable for printing.

3. The method of claim 1, wherein said PDL comprises PostScript Language.

4. A method of printing an upscaled image portion corresponding to a source image portion, said method comprising:
    determining a first scale factor to upscale said source image portion to generate said upscaled image portion, said first scale factor being at a first mathematical precision;
    determining a second scale factor to map each pixel of said upscaled image back to a corresponding pixel in said source image portion, said second scale factor being at a second mathematical precision; and determining whether a first pixel maps back to fall within said source image portion according to said second scale factor and said second mathematical precision, wherein said first pixel is comprised in said upscaled image portion.

5. The method of claim 4, wherein said first pixel is comprised in a border of said upscaled image, wherein only pixels at said border are mapped back to determine whether the corresponding pixels maps back to fall within said source image portion.

6. The method of claim 4, wherein said first mathematical precision is determined by a precision of a floating point operation, and said second mathematical precision is determined by a precision of a fixed point operation.

7. The method of claim 6, further comprising:

receiving said source image portion according to a page description language (PDL);

performing an interpretation of said source image portion at said first mathematical precision;

performing a rendering operation at said second mathematical precision to generate a plurality of pixel values representing said upscaled image portion; and sending said plurality of pixel values for printing.

8. The method of claim 7, further comprising checking whether each pixel in said upscaled image portion maps back to fall within said source image portion.

9. The method of claim 8, further comprising copying an adjacent pixel as a present pixel if said present pixel does not fall within said source image portion when mapped back.

10. A printer controller for processing an image data containing a plurality of pixels represented in a packed format, said image data in said packed format being represented in a compressed format, wherein said image data in said compressed format is contained in a page description language specifying a content to be printed on a page, said printer controller comprising:

a first buffer, a second buffer and a third buffer provided in a shared memory containing a limited memory space;

an external interface receiving a portion of said image data and storing said portion in said first buffer;

an uncompression block uncompressing said portion of said image data to generate an uncompressed data, said uncompressed data comprising said image data in said packed format, said uncompression block storing said uncompressed data in said second buffer;

a bit re-sampling block re-sampling said uncompressed data to generate said plurality of pixels in a desired format, wherein each of said plurality of pixels is aligned with a byte/word such that said desired format is suitable for additional computation of said plurality of pixels, said bit re-sampling block storing said plurality of pixels in said desired format in said third buffer, wherein a size of said third buffer is substantially greater than a size of said second buffer, and wherein said size of said second buffer is substantially greater than a size of said first buffer.

11. A computer readable medium encoded with one or more sequences of computer executable instructions for causing a printer to process an image data containing a plurality of pixels in an indexed format, wherein said image data is contained in a page description language specifying a content to be printed on a page, wherein execution of said one or more sequences of instructions by one or more processors contained in said printer causes said one or more processors to perform the actions of:

receiving said image data in said indexed format;

storing said image data in said indexed format in a memory;

converting said plurality of pixels to an expanded format by accessing a look-up table, wherein said lookup table specifies a mapping of said image data in said indexed format to said expanded format; and performing a plurality of raster operations using said plurality of pixels in said expanded format to generate a bit map representing said content, wherein said converting of a pixel is performed when said pixel is required by said performing such that said pixel can be stored in said memory in said indexed format.

12. The computer readable medium of claim 11, wherein said PDL comprises Printer Control Language.

13. The computer readable medium of claim 11, wherein said PDL comprises PostScript Language.

14. A computer readable medium encoded with one or more sequences of computer executable instructions for causing a printer to print an upscaled image portion corresponding to a source image portion, wherein execution of said one or more sequences of instructions by one or more processors contained in said printer causes said one or more processors to perform the actions of:

determining a first scale factor to upscale said source image portion to generate said upscaled image portion, said first scale factor being at a first mathematical precision;

determining a second scale factor to map each pixel of said upscaled image back to a corresponding pixel in said source image portion, said second scale factor being at a second mathematical precision; and determining whether a first pixel maps back to fall within said source image portion according to said second scale factor and said second mathematical precision, wherein said first pixel is comprised in said upscaled image portion.

15. The computer readable medium of claim 14, wherein said first pixel is comprised in a border of said upscaled image, wherein only pixels at said border are mapped back to determine whether the corresponding pixels maps back to fall within said source image portion.

16. The computer readable medium of claim 14, wherein said first mathematical precision is determined by a precision of a floating point operation, and said second mathematical precision is determined by a precision of a fixed point operation.

17. The computer readable medium of claim 16, further comprising:

receiving said source image portion according to a page description language (PDL);

performing an interpretation of said source image portion at said first mathematical precision;

performing a rendering operation at said second mathematical precision to generate a plurality of pixel values representing said upscaled image portion; and sending said plurality of pixel values for printing.

18. The computer readable medium of claim 17, further comprising checking whether each pixel in said upscaled image portion maps back to fall within said source image portion.

19. The computer readable medium of claim 18, further comprising copying an adjacent pixel as a present pixel if said present pixel does not fall within said source image portion when mapped back.

20. A printer controller for processing an image data containing a plurality of pixels in an indexed format, wherein said image data is contained in a page description language specifying a content to be printed on a page, said printer controller comprising:
- means for receiving said image data in said indexed format;
- means for storing said image data in said indexed format in a memory;
- means for converting said plurality of pixels to an expanded format by accessing a look-up table, wherein said lookup table specifies a mapping of said image data in said indexed format to said expanded format; and
- means for performing a plurality of raster operations using said plurality of pixels in said expanded format to generate a bit map representing said content,
- wherein said converting of a pixel is performed when said pixel is required by said performing such that said pixel can be stored in said memory in said indexed format.

21. The printer controller of claim 20, wherein said PDL comprises one of Printer Control Language and PostScript Language.

22. A printer controller for printing an upscaled image portion corresponding to a source image portion, said printer controller comprising:
- means for determining a first scale factor to upscale said source image portion to generate said upscaled image portion, said first scale factor being at a first mathematical precision;
- means for determining a second scale factor to map each pixel of said upscaled image back to a corresponding pixel in said source image portion, said second scale factor being at a second mathematical precision; and
- means for determining whether a first pixel maps back to fall within said source image portion according to said second scale factor and said second mathematical precision, wherein said first pixel is comprised in said upscaled image portion.

23. The printer controller of claim 22, wherein said first pixel is comprised in a border of said upscaled image, wherein only pixels at said border are mapped back to determine whether the corresponding pixels maps back to fall within said source image portion.

24. The printer controller of claim 22, wherein said first mathematical precision is determined by a precision of a floating point operation, and said second mathematical precision is determined by a precision of a fixed point operation.

25. The printer controller of claim 24, further comprising:
- means for receiving said source image portion according to a page description language (PDL);
- means interpreting said source image portion at said first mathematical precision;
- means for rendering at said second mathematical precision to generate a plurality of pixel values representing said upscaled image portion; and
- means for sending said plurality of pixel values for printing.

26. The printer controller of claim 25, further comprising means for checking whether each pixel in said upscaled image portion maps back to fall within said source image portion.

27. The printer controller of claim 26, further comprising means for copying an adjacent pixel as a present pixel if said present pixel does not fall within said source image portion when mapped back.

* * * * *